(No Model.)

L. P. VALIQUET.
LADY'S TRICYCLE.

No. 313,460.  2 Sheets—Sheet 1.

Patented Mar. 3, 1885.

WITNESSES:
Chas. Nida
C. Sedgwick

INVENTOR:
L. P. Valiquet
BY Munn & Co
ATTORNEYS.

(No Model.) 2 Sheets—Sheet 2.
L. P. VALIQUET.
LADY'S TRICYCLE.
No. 313,460. Patented Mar. 3, 1885.
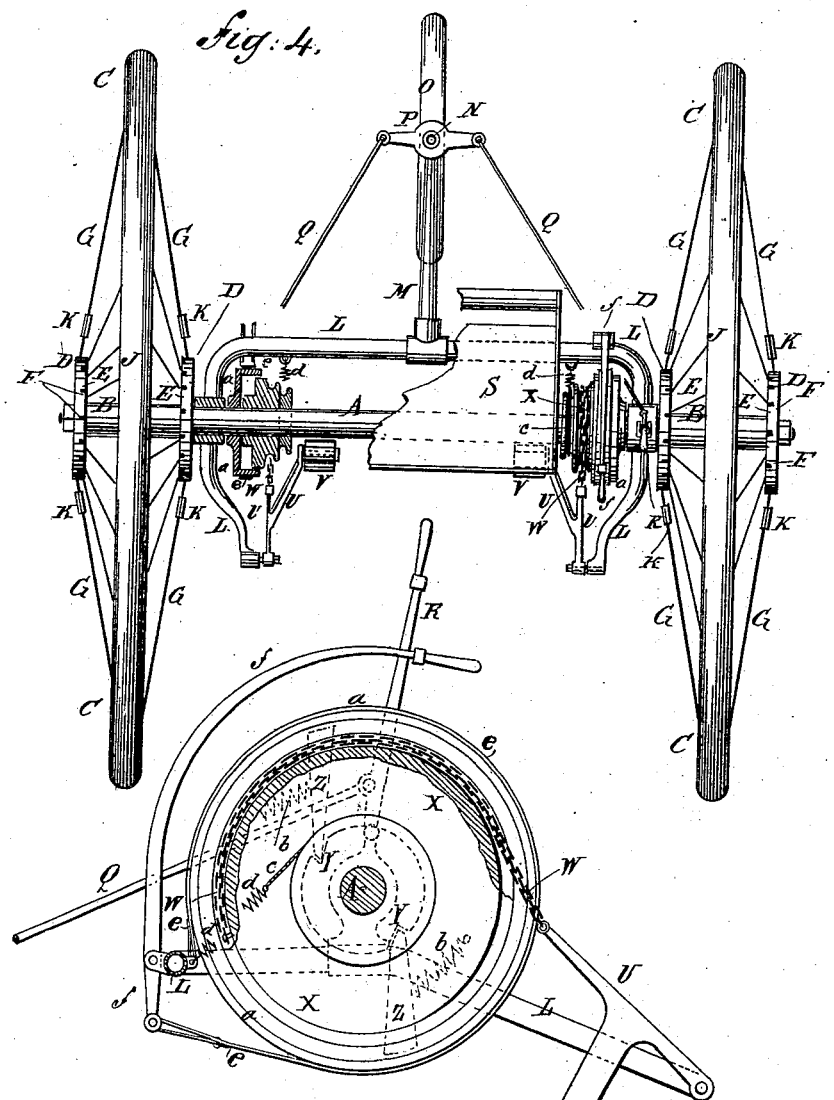

UNITED STATES PATENT OFFICE.

LOUIS P. VALIQUET, OF MOUNT KISCO, NEW YORK.

LADY'S TRICYCLE.

SPECIFICATION forming part of Letters Patent No. 313,460, dated March 3, 1885.

Application filed October 1, 1884. (No model.)

*To all whom it may concern:*

Be it known that I, LOUIS P. VALIQUET, of Mount Kisco, in the county of Westchester and State of New York, have invented certain new and useful Improvements in Ladies' Tricycles, of which the following is a full, clear, and exact description.

Reference is to be had to the accompanying drawings, forming part of this specification, in which similar letters of reference indicate corresponding parts in all the figures.

Figure 1:
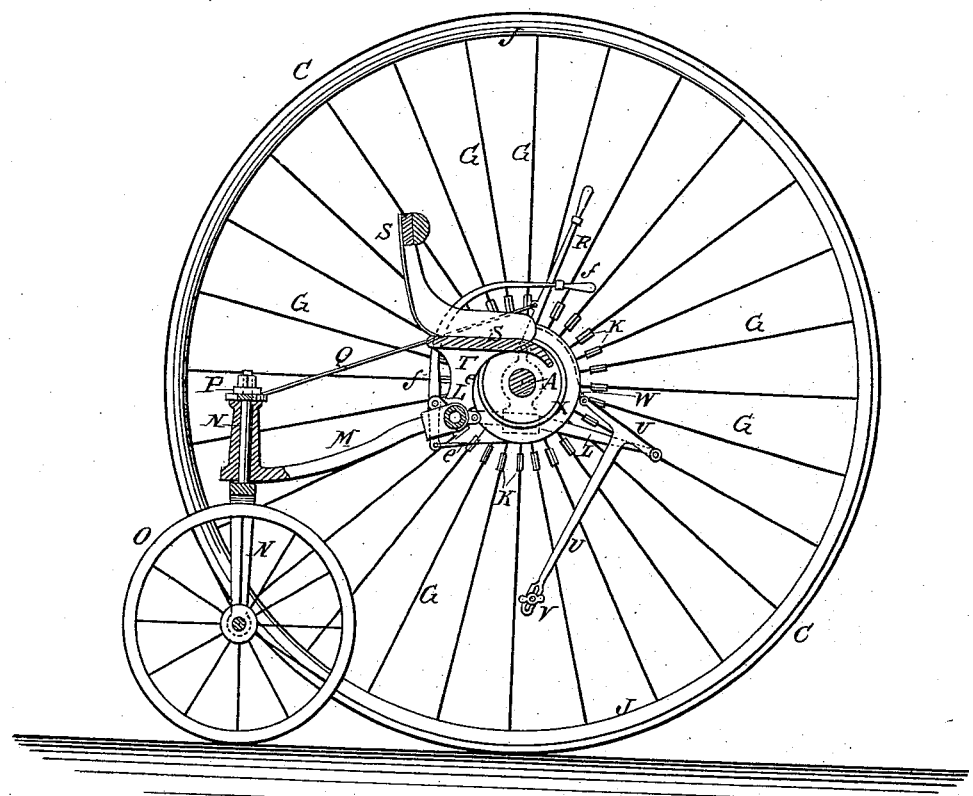
Figure 2:
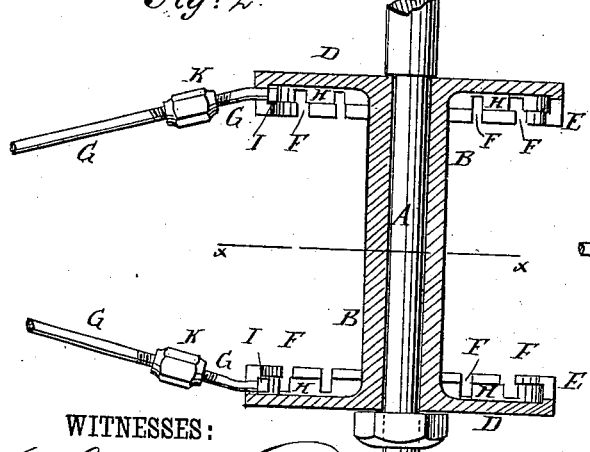
Figure 3:
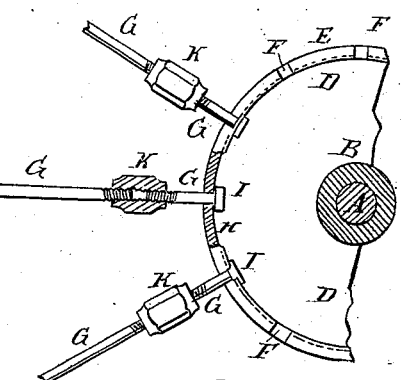

Figure 1, Sheet 1, is a sectional side elevation of one of my improved tricycles. Fig. 2, Sheet 1, is a sectional plan view of a wheel-hub, and showing a part of the axle and a part of two spokes. Fig. 3, Sheet 1, is a sectional elevation of the hub and axle, taken through the line $x\ x$, Fig. 2, and showing a part of three spokes. Fig. 4, Sheet 2, is a plan view of a tricycle, partly in section, and parts being broken away. Fig. 5, Sheet 2, is a side elevation of the clutch and its attachments enlarged, part being broken away, and the frame and axle being shown in section.

The object of this invention is to provide tricycles constructed in such a manner that they can be conveniently ridden and operated by ladies, and can be readily guided and controlled.

The invention consists of a frame, in the side arms of which the axle carrying the clutches is journaled, and of the three-armed foot-levers connected to arms of the said frame, and to the clutches. The clutch-casings rigidly connected with the axle and wheels are provided with a brake strap and lever connected with the frame, whereby the advance of the tricycle can be checked by pressure applied to the said clutch-casings. With the clutches having spring-held pawls, the clutch-casings, and the frame are connected chains and three-armed foot-levers, whereby the said clutches can be readily operated to give motion to the tricycle. With the clutches and the frame are connected cords or chains and springs, whereby the said clutches will be brought back to their former positions after each forward movement, as will be hereinafter fully described.

A represents the axle, to which are clamped, keyed, or otherwise secured the hubs B of the wheels C, so that the said axle will carry the said wheels with it in its revolution. The hubs B are made with circular flanges D upon their ends, and with inwardly-projecting rims E upon the edges of the said flanges. The rims E have slots F formed in them to receive the ends of the spokes G, and have annular grooves H formed in their inner surfaces to receive the cross-heads I, formed upon the inner ends of the said spokes to prevent the said spokes from slipping out of the slots F. The outer ends of the spokes G are screwed into or riveted or otherwise secured to the rims J of the wheels C. The spokes G are made in two parts connected by long right and left nuts K, or by swiveled nuts, so that the tension of the said spokes can be readily regulated to put the wheels under any desired strain, and to allow any or all the spokes to be detached when required. The axle A revolves in bearings in the side bars of the frame L, the cross or middle bar of which is parallel with and a little below the said axle A, as shown in Figs. 1 and 4.

Upon the center of the cross-bar of the frame L is formed, or to it is rigidly attached, a rearwardly-projecting arm, M, upon the rear end of which is formed a long vertical bearing for the standard N. The lower part of the standard N is slotted, and to it is journaled, the small steering-wheel O. To the upper end of the standard N is attached a cross-bar, P, to the ends of which are pivoted the rear ends of two rods, Q. The forward ends of the rods Q are pivoted to two levers, R, the lower ends of which are pivoted to lugs formed upon the side bars of the frame L, preferably directly over the axle A, so that the upper ends of the said levers can be readily reached and operated by the rider from her seat S. The seat S is attached to brackets or standards T, attached to or formed upon the cross-bar of the frame L.

To the forward ends of the side bars of the frame L are pivoted the ends of the short forward arms of the three-armed levers U. The lower arms of the three-armed levers U extend downward and rearward, and are provided with pivoted rests V, to receive the rider's feet for vibrating the said levers, and thus giving motion to the tricycle. The lower arms of the three-armed levers U are slotted to receive the bolts of the foot-rests V, so that the said foot-rest can be adjusted higher or lower, as may be required.

To the ends of the rear arms of the three-armed lever U are attached the forward ends of short chains W, which pass over the grooved movable clutches X, and are attached at their rear ends to the rear side of the said clutches X, so that the said movable clutches X will be turned forward as the lower arms of the three-armed levers U are moved downward and forward by the rider's feet.

Upon the sides of the inner ends of the hubs of the clutches X are formed recesses Y, to receive the inner ends of the pawls Z, the outer ends of which rest against the inner surfaces of the rims of the casings $a$ of the clutches, the said casings $a$ being keyed or otherwise secured to the axle A, so as to carry the said axle with them in their revolution. The pawls Z are held in place by spiral or other springs $b$, attached to them and to the said clutches X. The outer ends of the hubs of the clutches X are grooved, and to their forward sides are attached the forward ends of short chains or cords $c$, which pass over the said ends of the hubs, and are attached at their rear ends to the ends of spiral or other springs $d$. The other ends of the springs $d$ are attached to the cross-bar of the frame L, as shown in Figs. 4 and 5. With this construction, when the foot-pressure upon the three-armed levers U, which turned the movable clutches X forward, is withdrawn, the said movable clutches X and the levers U are drawn back to their former positions, ready to receive another impulse, by the springs $d$.

Around the rims of the clutch-casings $a$ are passed brake-straps $e$, one end of which is attached to the frame L, as shown in Figs. 4 and 5, and their other ends are attached to the lower ends of levers $f$. The levers $f$, at a little distance from their lower ends, are pivoted to lugs formed upon the frame L. The levers $f$ extend upward and are curved forward, as shown in Figs. 1, 4, and 5, to bring their upper ends into such a position that they can be readily reached and operated by the rider.

The wheel herein shown and described forms no part of the present application; but I reserve to myself the right to make a separate application therefor at some future time.

Having thus described my invention, what I claim as new, and desire to secure by Letters Patent, is—

1. In a lady's tricycle, the combination, with the axle A and a clutch thereon, of the frame L, having side arms in which the axle is journaled, and the three-armed foot-levers connected to the side arms of the said frame and to the clutch, substantially as herein shown and described.

2. In a lady's tricycle, the combination, with the rigidly-connected clutch-casing $a$, axle A, and wheels C, and the frame L, of the brake strap and lever $e$ $f$, substantially as herein shown and described, whereby the advance of the tricycle can be checked by pressure applied to the said clutch-casing, as set forth.

3. In a lady's tricycle, the combination, with the clutches X, having spring-held pawls, the clutch-casings $a$, and the frame L, of the chains W and the three-armed foot-levers U, substantially as herein shown and described, whereby the said clutches can be readily operated to give motion to the tricycle, as set forth.

4. In a lady's tricycle, the combination, with the clutches X and the frame L, of the cords or chains $c$ and the springs $d$, substantially as herein shown and described, whereby the said clutches will be brought back to their former positions after each forward movement, as set forth.

LOUIS P. VALIQUET.

Witnesses:
JAMES T. GRAHAM,
C. SEDGWICK.